United States Patent [19]

Lee

[11] Patent Number: 5,115,539

[45] Date of Patent: May 26, 1992

[54] BRAKING AND WHEEL-ORIENTING MECHANISM FOR A FOUR-WHEELED TROLLEY

[76] Inventor: Sheng-Hwa Lee, No. 38-1, Taa-Tzyy-Jyue, Taa-Jyue Tsuen, Guan-In Country, Taor-Yuarn County, Taiwan

[21] Appl. No.: 667,901

[22] Filed: Mar. 12, 1991

[51] Int. Cl.⁵ .............................................. B60B 33/00
[52] U.S. Cl. ..................................... 16/35 R; 188/1.12
[58] Field of Search .......................... 16/35 R, 35 D; 188/1.12

[56] References Cited

U.S. PATENT DOCUMENTS 2,114,586  4/1938  Bowen .................................. 16/35 D
4,998,320  3/1991  Lange .................................. 16/35 R

FOREIGN PATENT DOCUMENTS

77202  4/1987  Japan .................................. 16/35 R

Primary Examiner—Robert L. Spruill
Assistant Examiner—Carmine Cuda

[57] ABSTRACT

A braking and wheel-orienting mechanism for a four-wheeled trolley, which includes a brake cable divided into four strands each of which drives a braking system on one wheel so as to synchronously brake four wheels, and four additional wheel-orienting wires being applied to respectively control the orientations of four wheels.

3 Claims, 12 Drawing Sheets

BRAKING AND WHEEL-ORIENTING MECHANISM FOR A FOUR-WHEELED TROLLEY

BACKGROUND OF THE INVENTION

At present, a non-power four-wheeled trolley is widely used on various occasions. For example, sick bed, handcart used in a supermarket, baby cart, conveying trolley, etc. all are very useful implements. However, some accidents often occur when using these trolleys. For instance, such a trolley often slips away unexpectedly due to inclination of the ground so as to collide with persons or obstacles or even a car on a road. A braking mechanism for the trolley can be applied to stop the trolley. However, prior braking mechanism can only brake two of the four wheels of the trolley, while the other two can still rotate to make the trolley circle about the braked wheels.

Moreover, no wheel-orienting mechanism is provided for the conventional trolleys or only two of the four wheels are provided with the wheel-orienting mechanism. Therefore, when the trolley is moved upward on an inclination, a user must exert more force on the trolley to prevent the trolley from displacing laterally.

SUMMARY OF THE INVENTION

It is therefore a primary object of this invention to provide a braking and wheel-orienting mechanism for a four-wheeled trolley, which can eliminate the shortcomings existing in prior art.

Accordingly, the present invention includes a brake cable divided into four strands each of which drives a braking system on one wheel. The braking system includes a slide block and a lifting shaft. The lower end of the lifting shaft is secured to a brake block or a block rod. The slide block is pulled by the brake cable and pressed by a compression spring. On two sides of the slide block are formed symmetric slant strip projections and on upper portion of the lifting shaft is formed a groove within which the slide block is slidable, whereby when the brake cable is released, the slide block automatically moves backward, forcing the lifting shaft to descend so as to make the brake block or brake rod work and brake the wheel.

Furthermore, the present invention includes four orienting wires each of which controls the orientation of one wheel. Each orienting wire drives an orienting system on a wheel. The orienting system includes a slide block and a lifting shaft. The slide block is pulled by an orienting wire and pressed by a compression spring. The lower end of the lifting shaft is formed with a projection whereby similarly to the brake system, the projection can move downward into a rotary seat of the wheel, preventing the rotary seat from rotating and thus orienting the wheel.

When applied to a relatively large or high trolley (such as a sick bed), the slide block in the brake system and orienting system of this invention can be omitted and the lifting shaft is directly pulled and released by the cable.

DETAILED DESCRIPTION OF THE PREFERRED EMBODIMENTS

Please first refer to FIGS. 1A, 1B, 2A and 2B. Four wheel supports 20 are disposed under the chassis of a trolley. The wheel support 20 includes a fixing seat 21 and a rotary seat 22. The rotary seat 22 is rotatable about a shaft pipe 23 of the fixing seat 21. The brake system of the wheel support 20 includes a slide block 24 and a lifting shaft 25. The slide block 24 is pulled by a brake cable 30 and pressed by a compression spring 26 to resist the pulling force of the brake cable 30. Please refer to FIG. 3. On two sides of the slide block 24 are formed symmetrical slant strip projections 27. The lower end of the lifting shaft 25 is secured to a brake block 28 and a groove 29 is formed on the upper portion of the lifting shaft 25. The slide block 24 is slidable within the groove 29. Two slant channels 31 are formed in the groove 29 corresponding to the strip projections 27 of the slide block 27 to fitly receive the strip projections 27 so that the horizontal movement of the slide block 24 will make the lifting shaft 25 displace vertically.

Figure 1A:
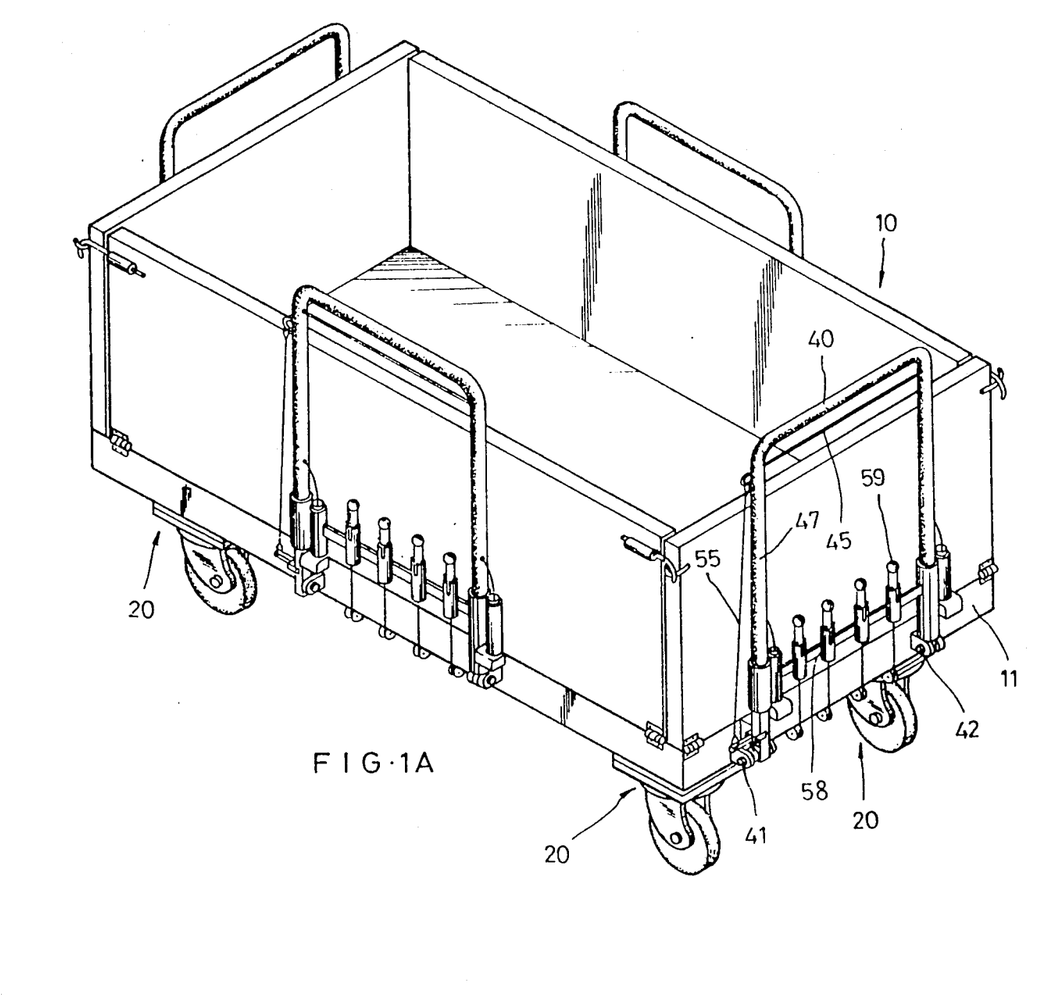
FIG. 1A is a perspective view of this invention.
Figure 1B:
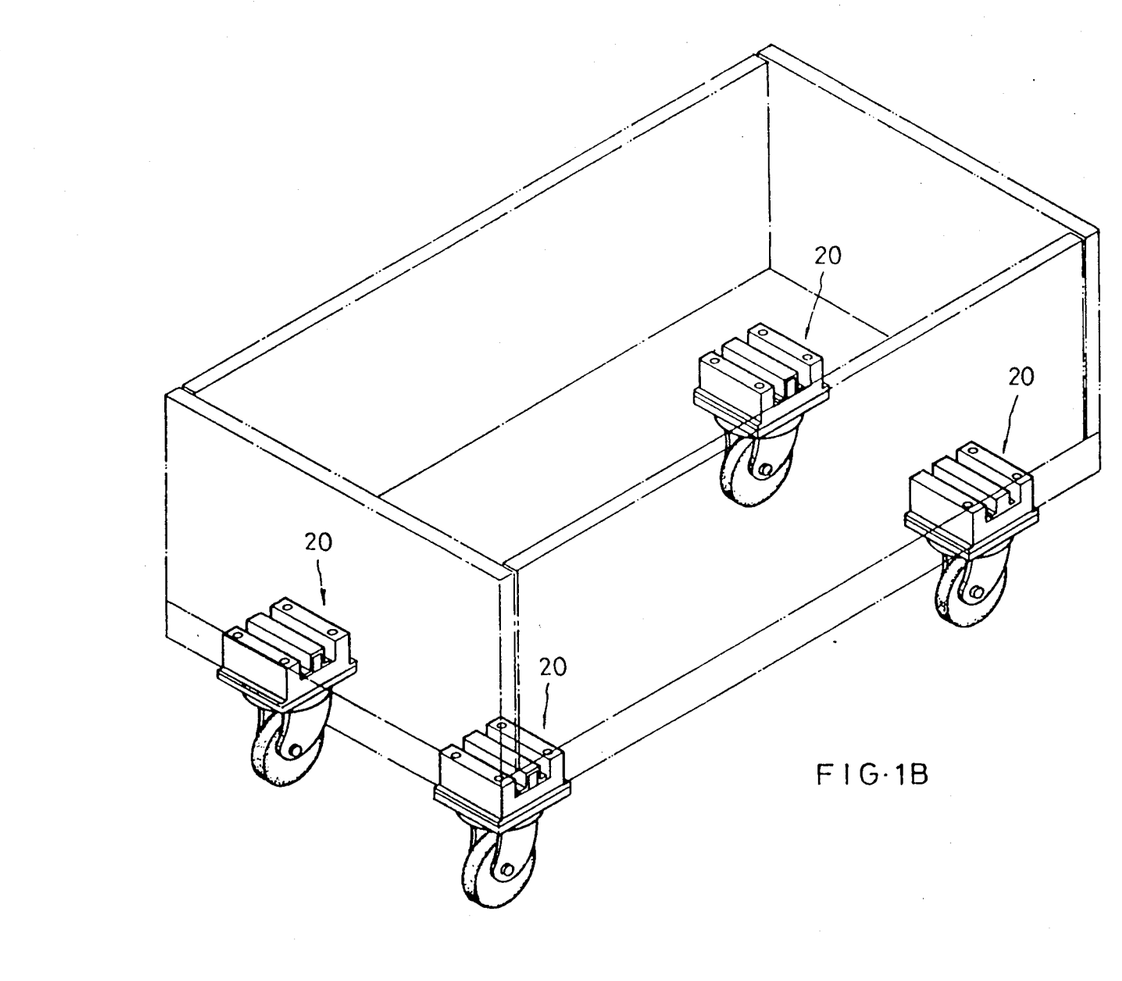
FIG. 1B illustrates the arrangement of the wheel supports of this invention.
Figure 2A:
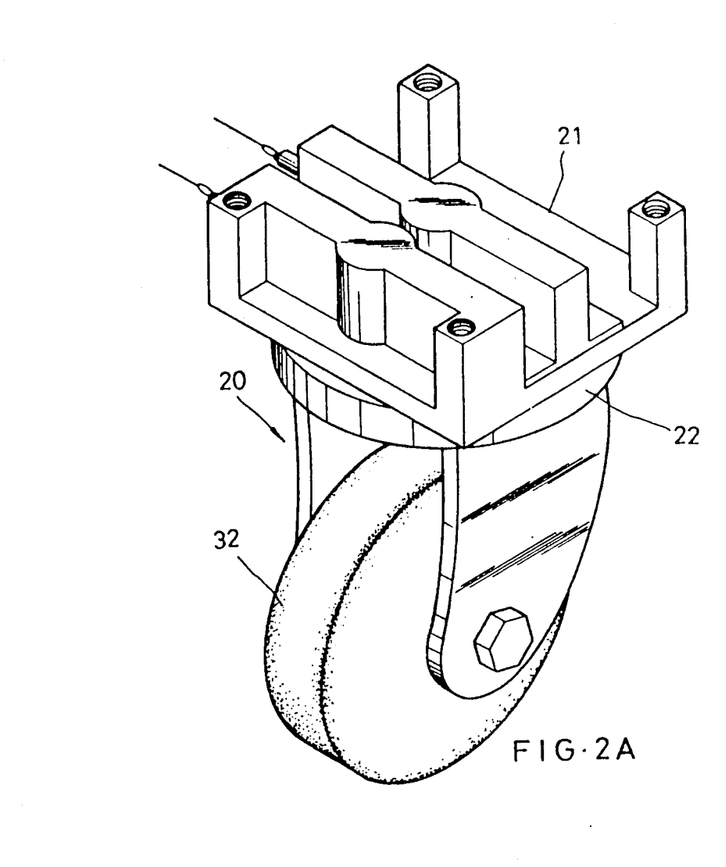
FIG. 2A is a perspective view of the wheel support thereof.
Figure 2B:
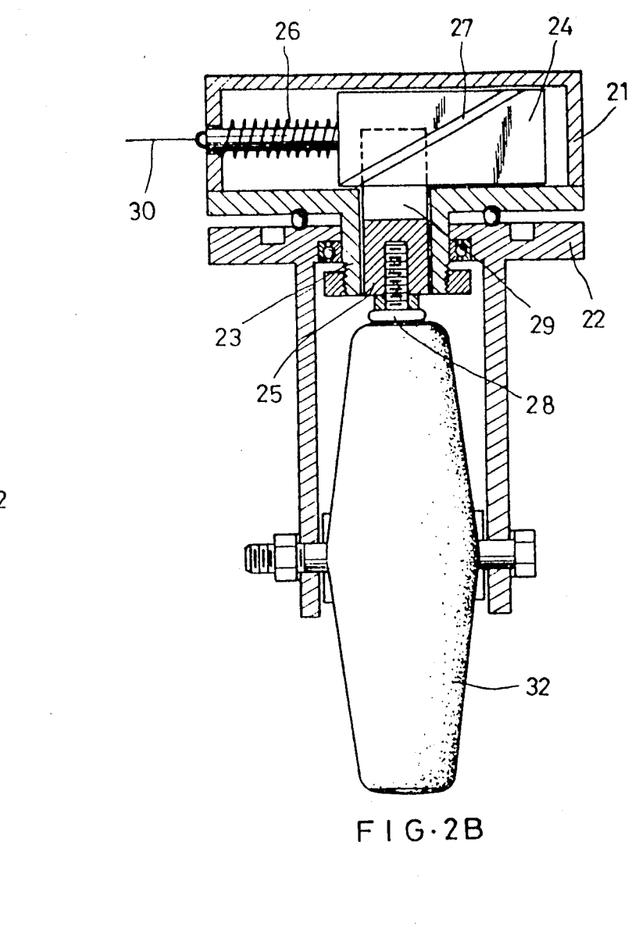
FIG. 2B is a central longitudinal sectional view according to FIG. 2A.
Figure 3:
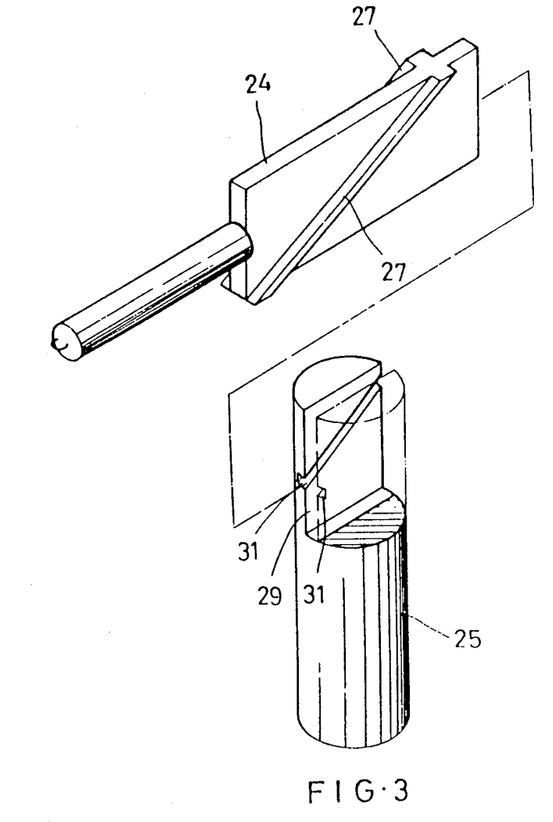
FIG. 3 is an exploded view of the slide block and lifting shaft of this invention.

When the brake cable 30 pulls the slide block 24 to make the lifting shaft 25 ascend, the compression spring 26 will be compressed. When the brake cable 30 is released, the spring 26 will restore and make the slide block 24 move backward. At this time, the lifting shaft 25 descends until the brake block 28 secured to its lower end abuts against the wheel 32 and stops the same.

Figure 4A:
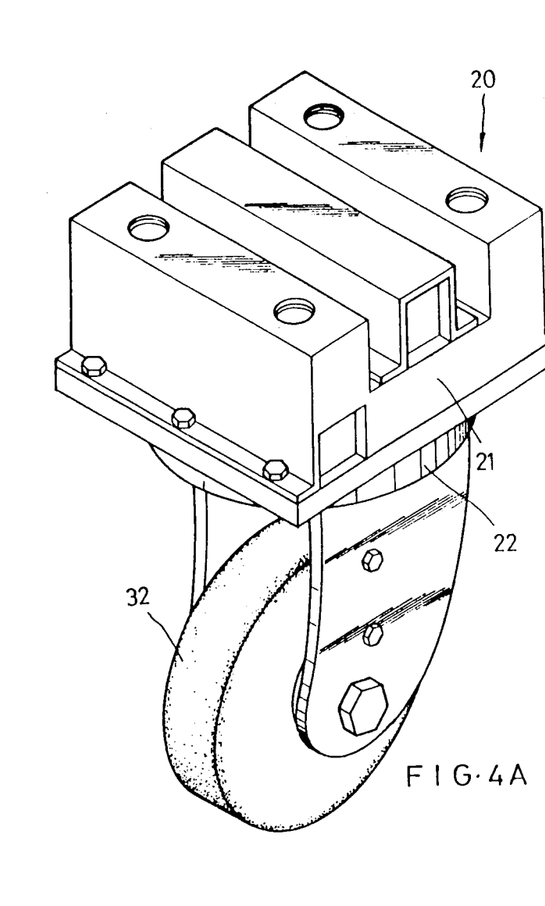
FIG. 4A is a perspective view of another wheel support (employing brake rod) of this invention.
Figure 4B:
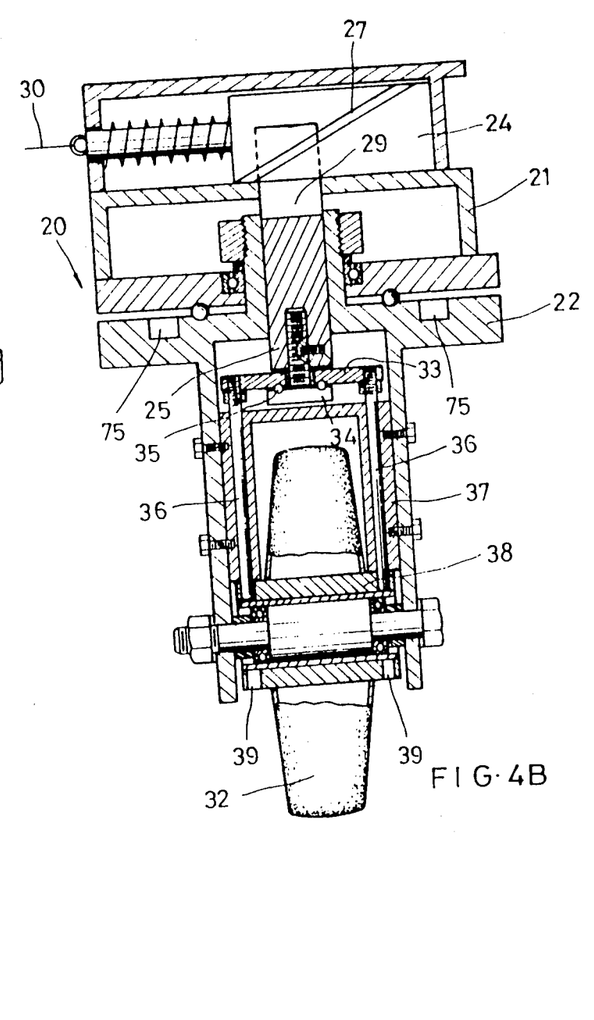
FIG. 4B is a central longitudinal section view according to FIG. 4A.
Figure 5A:
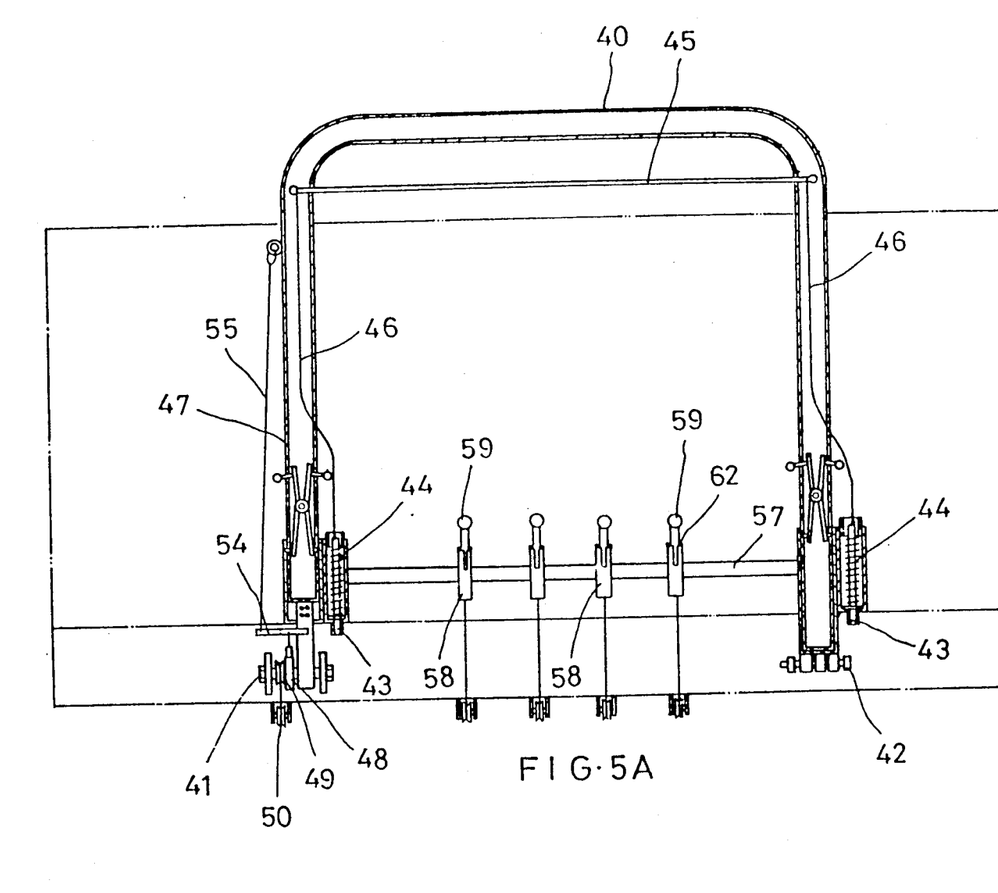
FIG. 5A shows the structure of the pushing frame of this invention.
Figure 5B:
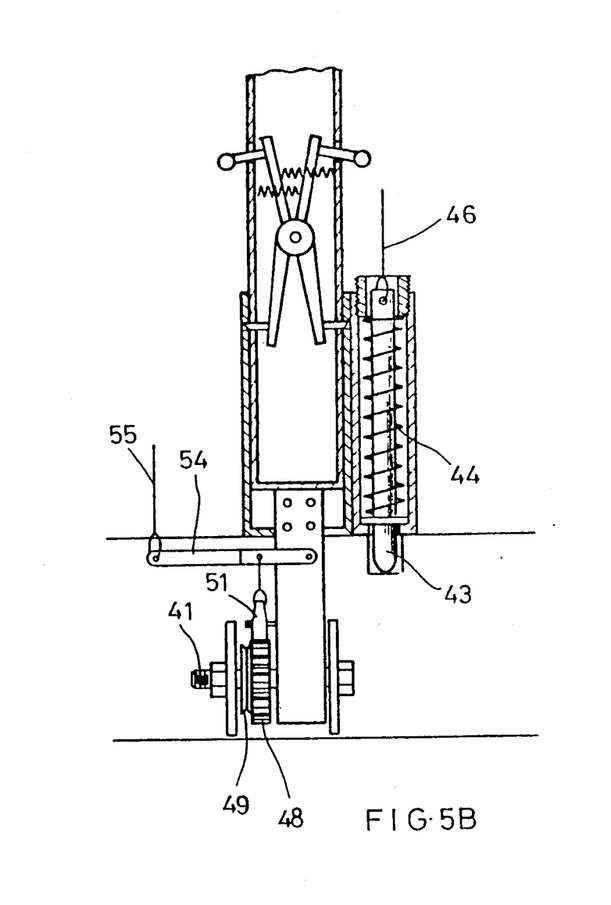
FIG. 5B and 5C show the support leg of the pushing frame of this invention.
Figure 5C:
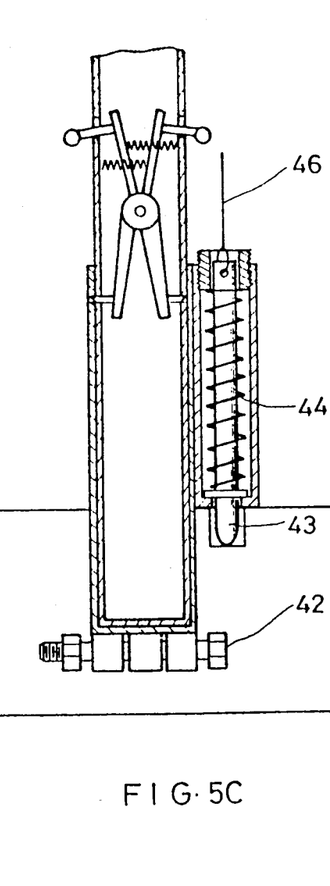
Figure 5D:
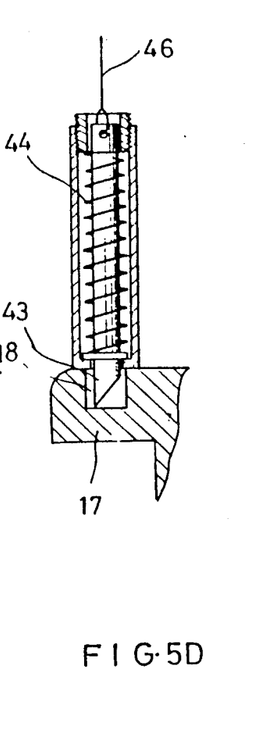
FIG. 5D is a side elevation of the securing pin of the pushing frame.

In case the trolley is designed to carry heavier articles, after it is loaded and moved, a greater impulse will be created. Therefore, the brake block 28 may be insufficient to stop the trolley and a brake rod 36 is replaced for the brake block 28 as shown in FIGS. 4A and 4B. A board member 33 is secured to the lower end of the lifting shaft 25. The board member 33 is rotatable by means of a ball disk 35 disposed between the board member 33 and a fixing screw 34. The board member 33 is secured to two brake rods 36 which are guided in vertical movement by a base 37 having two through holes. Moreover, on two sides of the shaft pipe 38 of the wheel 32 are formed extending portion 38 having several recess holes 39 whereby when the lifting shaft 25 descends, the brake rods 36 are lowered to extend into the recess holes 39 of the shaft pipe 38 of the wheel 32 to brake the wheel 32. The number of the recess holes 39 of the shaft pipe 38 can be eight or more than eight. This type of brake system can create quite large braking force and is thus suitable for large trolleys.

Figure 2C:
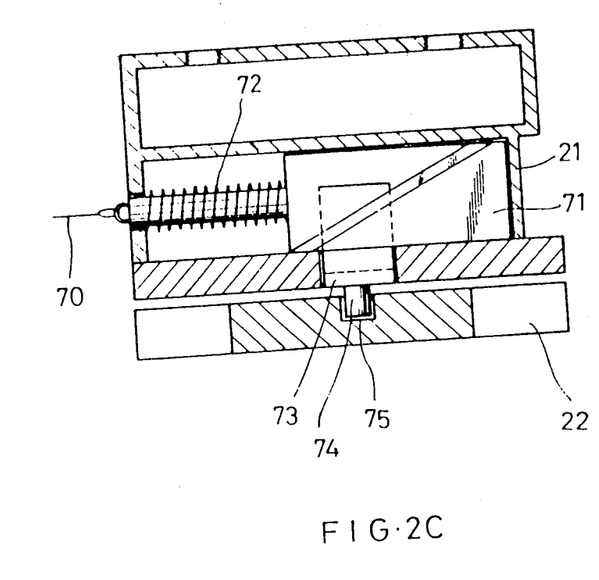
FIG. 2C is an eccentric longitudinal sectional view according to FIG. 2A.

As shown in FIG. 2C the wheel-orienting system of this embodiment includes a slide block 71 fitted with a compression spring 72 and a lifting shaft 73 the lower end of which is formed with a projection 74. The operation of the slide block 71 and lifting shaft 73 is identical to that of the slide block 24 and the lifting shaft 25 in the brake system. The slide block 71 is pulled by an orienting wire 70 whereby when the orienting wire 70 is released, the slide block 71 moves, making the lifting shaft 73 descend to allow the projection 74 formed at lower end of the lifting shaft 73 to extend into the recess holes 75 of the rotary seat 22 of the wheel 20 and orient the wheel 20. In this embodiment, four recess holes 75 are formed on the rotary seat 22 at equal angle.

Please now refer to FIGS. 5A through 5D. The pushing frame 40 of this embodiment includes two legs pivoted to the chassis 11 of the trolley by two shafts 41, 42. The pushing frame 40 therefore can rotate about the shafts 41, 42. Two fixing pins 43 are disposed beside the two legs of the pushing frame 40. The two pins 43 can extend into two holes 18 of two projections 17 extending from the chassis 11. The fixing pin 43 is fitted with a compression spring 44 and a pull lever 45 is disposed on the pushing frame 40. Each end of the pull lever 45 is connected with a wire 46 which can pull the fixing pin 43. When pulling the pull lever 45, the fixing pin 43 is pulled upward to separate from the chassis 11, permitting the pushing frame 40 to swing downward.

Figure 6:
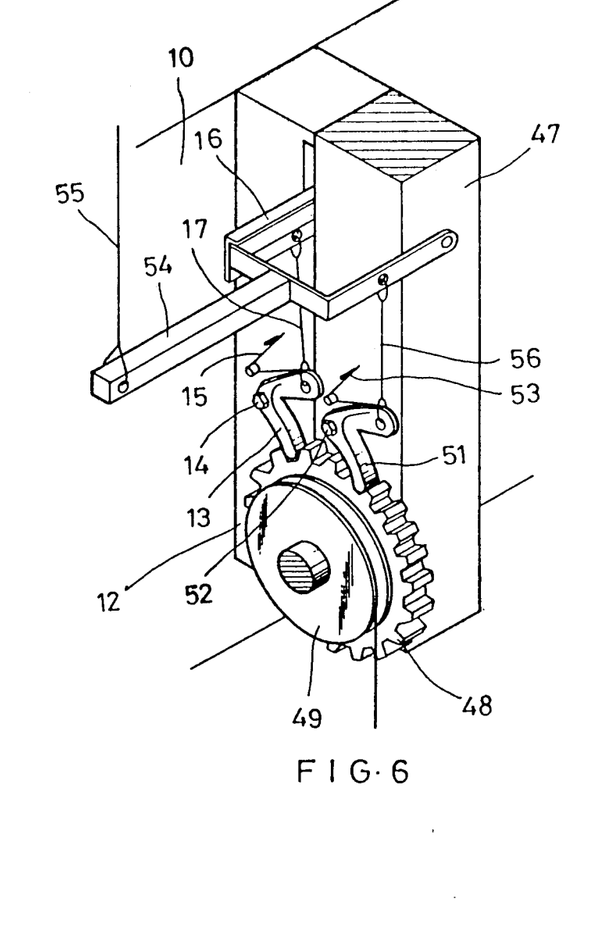
FIG. 6 is a perspective view of the brake system disposed at lower end of the left support leg of the pushing frame.

Please refer to FIG. 6 with FIGS. 5A through 5D. A gear 48 is disposed on a pivot shaft 41 of a left support leg 47 of the pushing frame 40. The wire wound on a wire drum 49 connects with the slide block 24 of each wheel through a roller 50. An L-shaped abutting block 51 is disposed on the lower portion of the left support leg 47 of the pushing frame 40. The abutting block 51 is pivotable about a pivot pin 52 located at the central bent portion of the abutting block 51. A compression spring 53 is disposed above the abutting block 51 to press the same downward and make the lower end of the abutting block 51 extend between the teeth of the gear 48 to prevent the gear 48 from rotating reversely. A projecting block 12 extends from the trolley body 10. An L-shaped abutting block 13 is disposed on the projecting block 12. The L-shaped abutting block 13 is pivotable about a pivot pin 14 located at the central bent portion of the abutting block 13. A compression spring 15 is disposed above the abutting block 13 to press the same downward and make the lower end of the abutting block 13 extend between the teeth of the gear 48 to prevent the gear 48 from rotating reversely. A fork-shaped member 54 is disposed under the left support leg 47 of the pushing frame 40. Two legs of the fork-shaped member 54 are pivoted to the left support leg 47 and the stem of the fork-shaped member 54 is connected to the upper portion of the pushing frame 40 by a wire 55. One of the two legs of the fork-shaped member 54 is connected to the abutting block 51 by a wire 56 while the other leg extends into a -shaped board 16 which is disposed on the projecting block 12 of the carriage 10 and can swing up and down. The -shaped board 16 is connected to the L-shaped abutting block 13 by a wire 17, whereby when a user pulls the wire 55 upward, the fork-shaped member 54 moves upward, making the L-shaped abutting block 51 separate from the gear 48. At the same time, one leg of the fork-shaped member 54 will drive the -shaped board 16 upward, making the other L-shaped abutting member 13 separate from the gear 48. In this condition, the gear 48 is free from restriction and the slide block 24 of the brake system of each wheel is moved by the restoring force of the compression spring 26 to brake the wheel 32. To remove the braking effect on the wheel 32, the user can pull the pull lever 45 to release the pushing frame 40 and then the user can swing the pushing frame 40 slightly downward. At this time, the L-shaped abutting block 51 makes the gear 48 rotate back to again pull the slide block 24. When the pushing frame 40 is swung upward, the L-shaped abutting block 13 abuts against the gear 48 to prevent the same from rotating reversely. This procedure can be repeated for several times to achieve the object of pulling the slide block 24 again.

Figure 7:
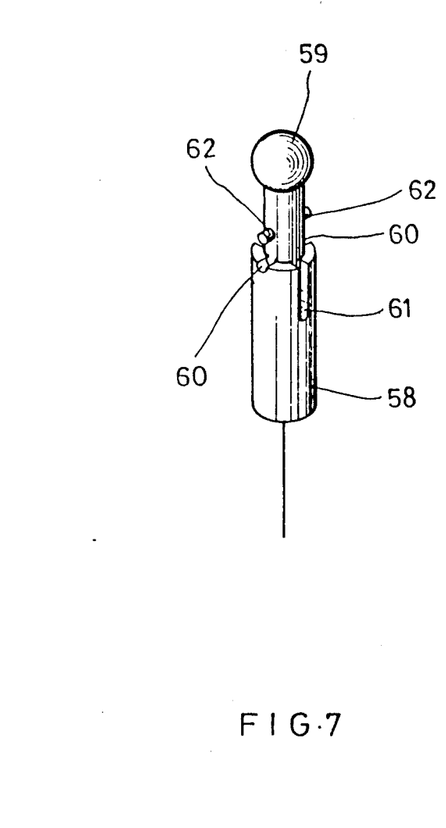
FIG. 7 is a perspective view of the orienting lever of this invention.

A beam member 57 is disposed under the pushing frame 40. Four tube members 58 are disposed on the beam member 57 for mounting the orienting levers 59 of four wheels. As shown in FIG. 7, the orienting lever 59 goes through the tube member 58 and the lower end of the orienting lever 59 is connected with a wheel-orienting wire 70. Two opposite recesses 60 are formed on upper end of the tube member 58 and two opposite slots 61 are also formed thereon. The interval between the recess 60 and the slot 61 is a right angle. The orienting lever 59 is correspondingly formed with two protuberances 62 whereby when the protuberances 62 fit into the recesses 60 of the tube member 58, the wheel-orienting wire 70 is pulled to further pull the slide block 71 to compress the compression spring 72. At the same time, the lifting shaft 73 ascends, allowing the wheel 32 to rotate within 360° range. When the orienting lever 59 is rotated by 90°, the two protuberances 62 will go into the slots 61, making the wheel-orienting wire 70 free from restriction. At this time, the restoring force of the compression spring 72 will push the slide block 71, making the lifting shaft 73 descend with its lower projection 74 fitted into the recess hole 75 of the rotary seat 22 so as to fix the rotary seat 22 and achieve the object of wheel-orientation.

Figure 8:
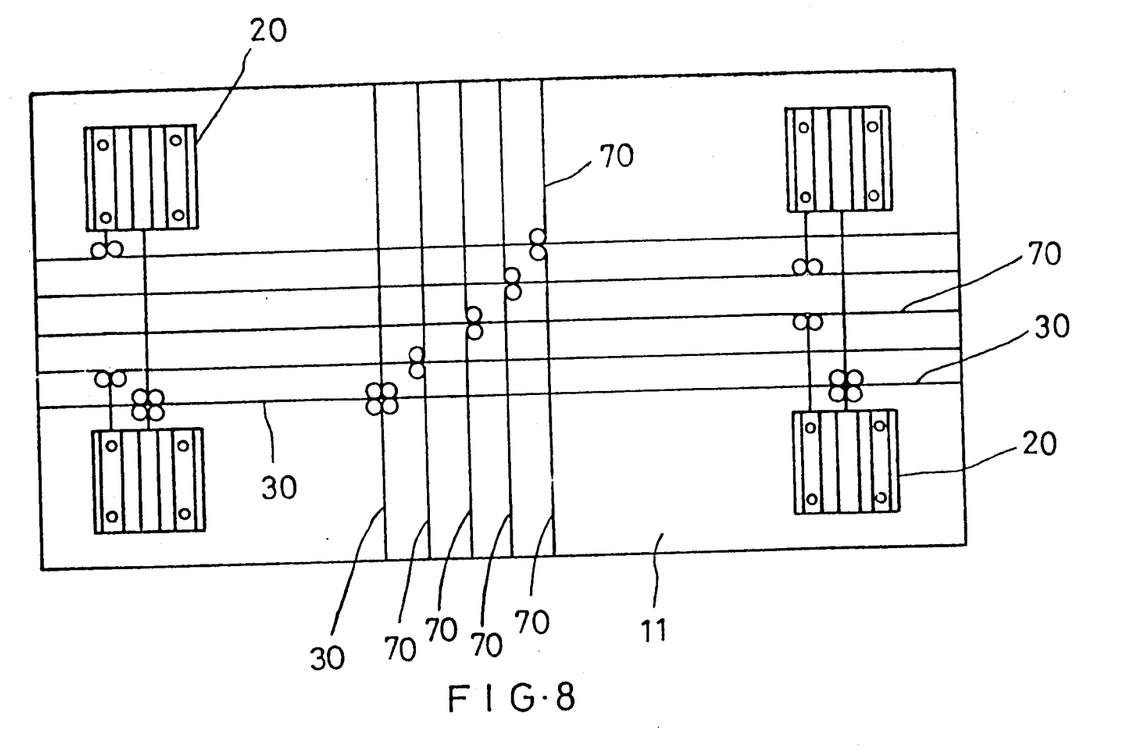
FIG. 8 shows the arrangement of the brake cable and orienting wire disposed under the chassis of the trolley.

FIG. 8 shows the arrangement of the brake cables 30 and wheel-orienting wires 70 disposed under the chassis of the trolley. By means of the arrangement, four wheels can be braked at a time and the wheels can be oriented individually. In practical use, generally two wheels are oriented at a time for turning the trolley or four wheels are oriented at a time for straightly pushing the trolley. The trolley can be provided with the pushing frame 40 only on one side or on all four sides for the convenience of pushing. When used, only the operated pushing frame 40 possesses functions of braking and wheel-orientation, while other three pushing frames 40 are set into a release state to enable the operated one to work normally.

Figure 9:
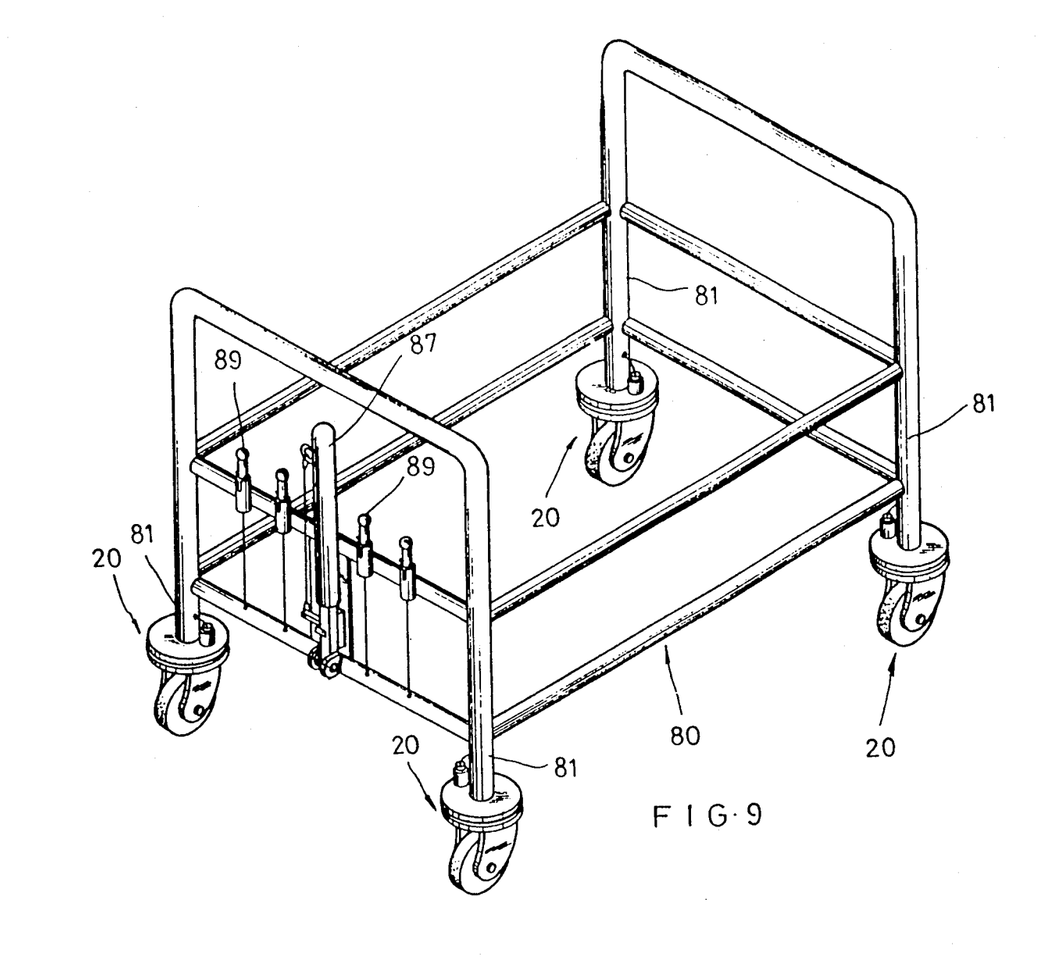
FIG. 9 shows the application of this invention to a sick bed.
Figure 10A:
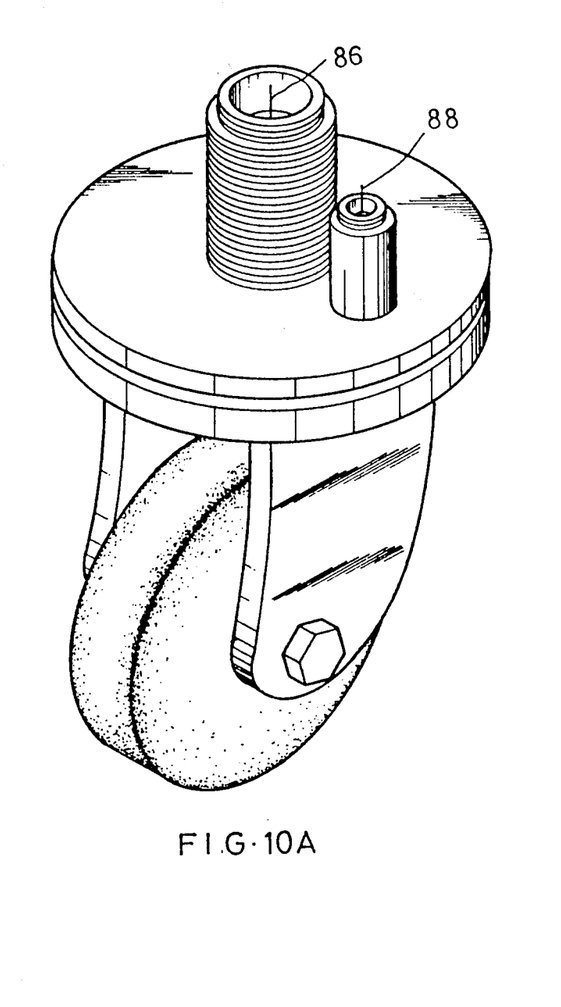
FIG. 10A is a perspective view of the wheel support used in a sick bed.
Figure 10B:
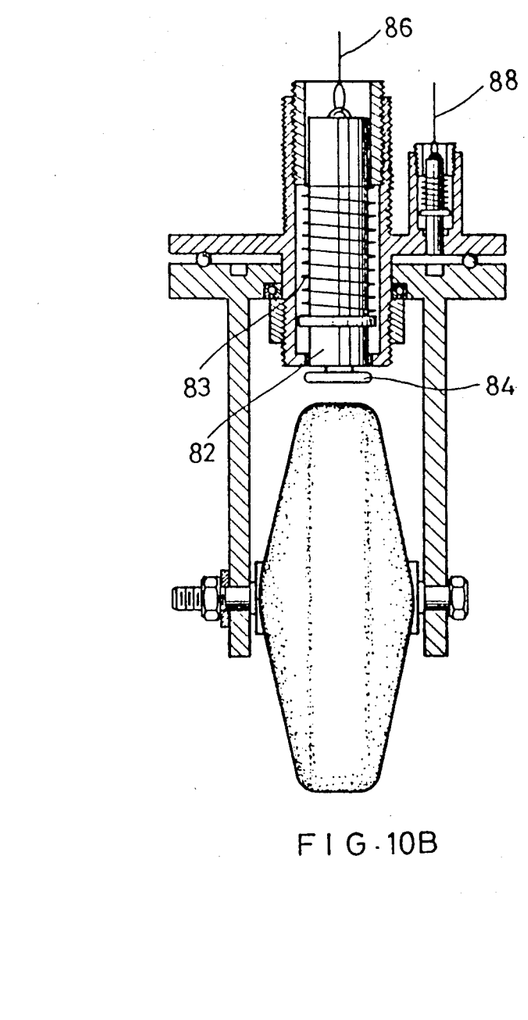
FIG. 10B is a longitudinal sectional view according to FIG. 10A.
Figure 11A:
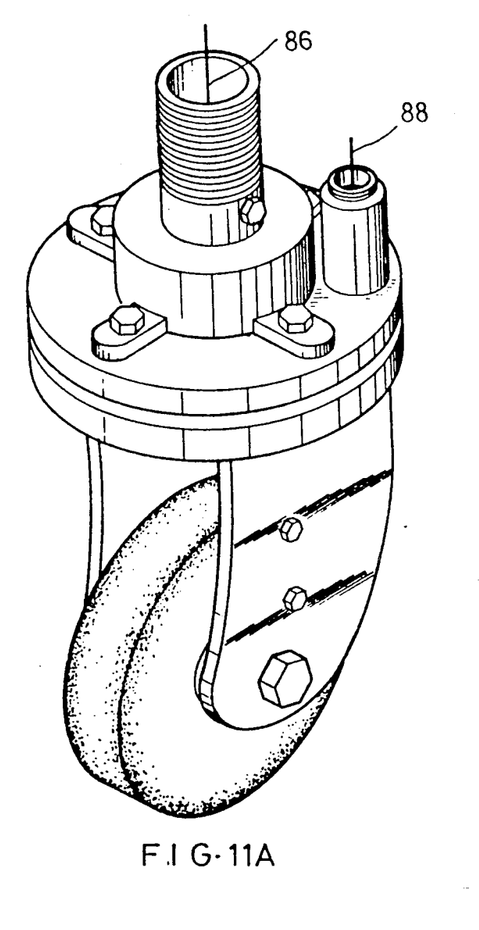
FIG. 11A is a perspective view of another wheel support (employing a brake rod) used in a sick bed.
Figure 11B:
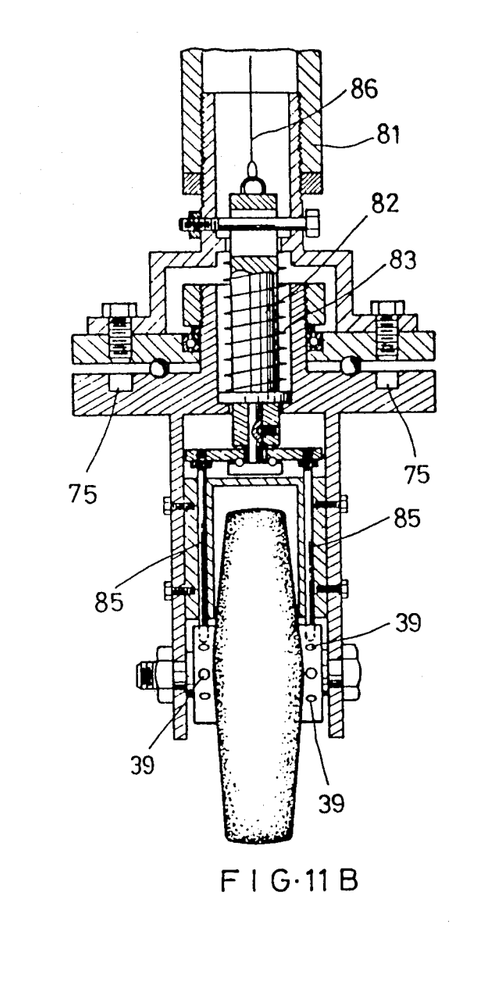
FIG. 11B is a longitudinal sectional view according to FIG. 11A.

When applied to a trolley with higher chassis, such as a sick bed, the brake system and wheel-orienting system of the present invention can be facilitated. As shown in FIG. 9, the wheel supports 20 can be directly screwed on the lower ends of four support columns 81 of the sick bed 80. The brake system thereof includes a lifting shaft 82 fitted with a compression spring 83. The lower end of the lifting shaft 82 is secured to a brake block 84 or a brake rod 85 (as shown in FIGS. 10A, 10B, 11A and 11B). The lifting shaft 82 is directly pulled by the brake cable 86. The brake cables 86 of four wheels are linked together at one end of the sick bed 80 to be operated by a pushing lever 87 (like the pushing frame 40). Moreover, the wheel-orienting wires 88 of the wheels extend along the sick bed 80 toward the orienting levers 89 to be respectively operated by the orienting levers 89.

The present invention can simultaneously brake four wheels of the trolley so that the trolley will not further move after braked. Therefore, the safety can be ensured. In addition, the present invention can orient the wheels of the carriage, permitting the trolley to be more conveniently turned or pushed straightly.

I claim:

1. A braking and wheel-orienting mechanism for a trolley having four wheels, said mechanism comprising:
   an identical braking system on each of said four wheels simultaneously operated by a pushing frame, and a wheel-orienting system on each of said four wheels simultaneously operated by four orienting levers disposed on said pushing frame, wherein,
   said braking system includes a slide block fitted with a compression spring and a lifting brake shaft,
   said slide block having two symmetrical slant strip projections on sides of said slide block,
   said lifting shaft having a groove corresponding to said slant strip projections
   said groove permitting said slide block to slide therewithin,
   whereby when said slide block moves horizontally, said lifting shaft displaces vertically, wherein,
   said wheel-orienting system includes a second slide block fitted with a compression spring and a lifting shaft, the lower end of said lifting shaft having a projection whereby when said slide block moves horizontally, the lifting shaft moves vertically,
   each of said four wheels having a support including a fixing seat and a rotary seat, said rotary seat being formed with four recesses at equal angle intervals, wherein,
   said pushing frame has two support legs pivoted to said trolley and fixed in a standing position by fixing pins, wherein a left leg of said support legs is provided with a gear connected with a wire drum,
   said left leg having a fork-shaped member having two legs and a stem,
   said two legs of said fork-shaped member being pivoted to said left leg and said stem being connected to the upper portion of said pushing frame by a wire,
   one of said two legs of said fork-shaped member being connected to a first L-shaped abutting block pivoted to said left leg by a wire,
   said abutting block being fitted with a compression spring, biasing the lower end of said abutting block to extend between the teeth of said gear,
   the other of said two legs of said fork-shaped member extending to a -shaped board pivoted to the carriage,
   said - shaped board being connected to a second L-shaped abutting block pivoted to the carriage by a wire,
   said abutting block being fitted with a compression spring, making the lower end of said abutting block extend into the teeth of said gear,
   a beam being disposed on said pushing frame, four tube members being disposed on said beam,
   four orienting levers being disposed in said tube members, each of said orienting levers being formed with two protuberances, the upper end of said tube member being formed with two corresponding recess holes and two slots,
   whereby said slide block of said braking system being pulled by a brake cable, and all brake cables are grouped and wound on said wire drum disposed on said left support leg,
   while said slide block of said wheel-orienting system is pulled by an orienting wire and said orienting wire is connected to a corresponding orienting lever disposed on said pushing frame,
   whereby when said fork-shaped member ascends, said
   -shaped board is driven to ascend, making said first and second abutting blocks separate from said gear to permit said slide block to move to lower said lifting shaft to brake the wheel,
   said pushing frame repeatedly swingable to rewind said brake cable for pulling back said slide block,
   whereby when said protuberances of said orienting lever enter said slots of said tube member, said slide block moves to lower said lifting shaft so that the lower projection thereof extends into said recess of said rotary seat of said wheel support to orient the wheel,
   and when said orienting lever is pulled upward, making said protuberances enter said recess holes of said tube member, said slide block is pulled back to lift said lifting shaft.

2. A braking and wheel-orienting mechanism as claimed in claim 1, wherein said lower end of said lifting shaft of said braking system is secured to a brake block which can abut against the wheel to brake the trolley.

3. A braking and wheel-orienting mechanism as claimed in claim 1, wherein said lower end of said lifting shaft of said braking system is secured to a board, and two brake rods are fastened to said board and guided by a seat member having two through holes whereby when said lifting shaft descends, said two brake rods are extended into the hole of the shaft pipe of the wheel to brake the trolley.

* * * * *